May 21, 1935.   S. P. TSCHAPPAT   2,001,946
TUBING HEAD
Filed Dec. 17, 1934   2 Sheets-Sheet 1
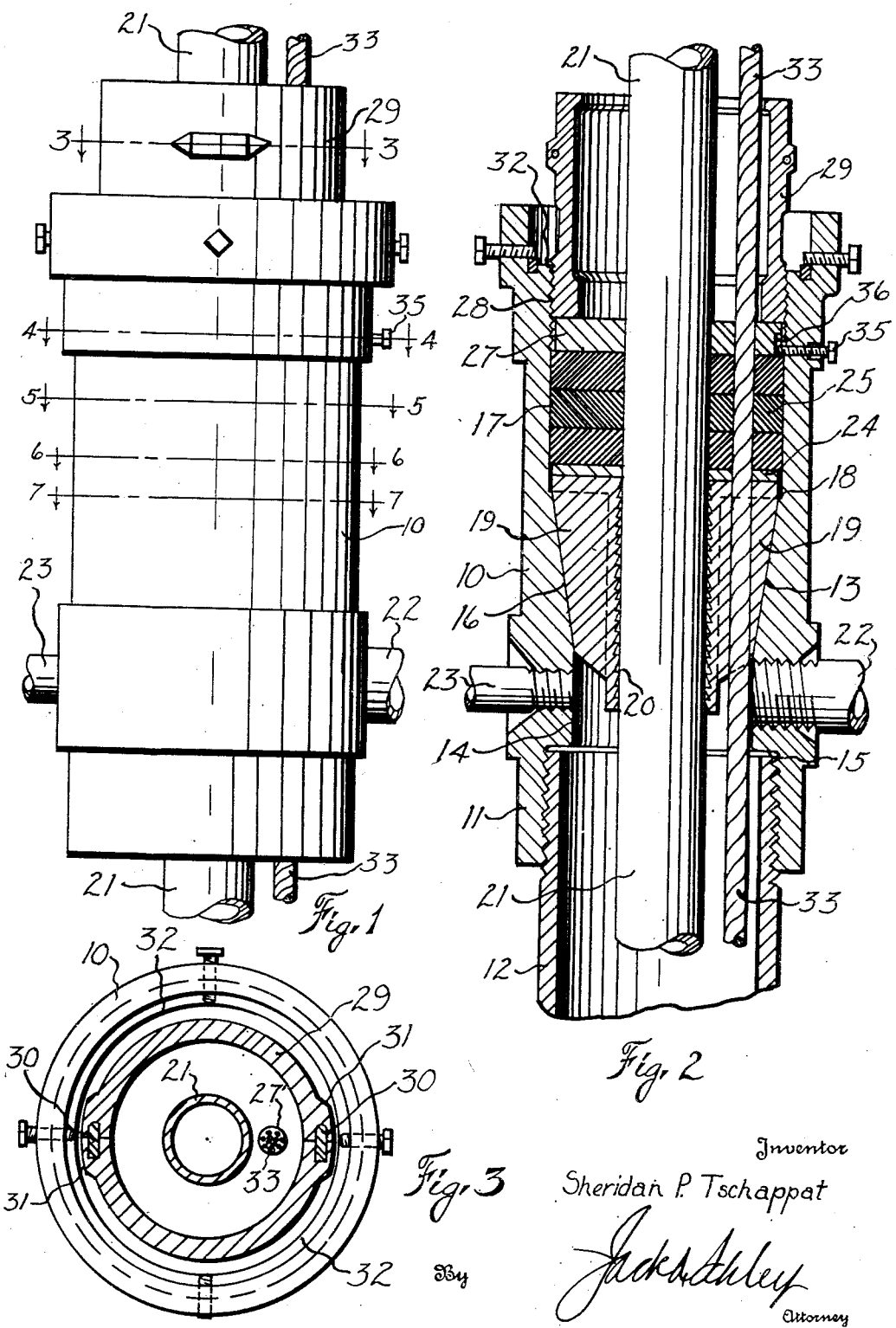
Inventor
Sheridan P. Tschappat Patented May 21, 1935

2,001,946

UNITED STATES PATENT OFFICE 2,001,946

TUBING HEAD

Sheridan P. Tschappat, Tulsa, Okla.

Application December 17, 1934, Serial No. 757,908

11 Claims. (Cl. 166—14)

This invention relates to new and useful improvements in tubing heads.

One object of the invention is to provide an improved tubing head having means for supporting a tubing and means for packing-off both the tubing and casing, together with provision for packing-off a cable, small pipe or other member passing through the head outside of the tubing.

Another object of the invention is to provide a tubing head having slips and packing therein, arranged so that a cable, small pipe, or other member may extend through both the slips and the packing without interfering with the normal functions of these elements.

A further object of the invention is to provide a tubing head having provision for the extension therethrough of an extraneous element which may be effectually sealed-off, and means for compressing the packing in the head and around said element, which latter is stationary.

Still another object of the invention is to provide means for holding the packing assembly against rotation when the compression member is rotated to compress the packing.

A construction designed to carry out the invention will be hereinafter described, together with other features of the invention.

The invention will be more readily understood from a reading of the following specification and by reference to the accompanying drawings, in which an example of the invention is shown, and wherein:

Figure 1 is an elevation of a tubing head constructed in accordance with the invention and showing a cable extending therethrough.

Figure 2 is a vertical sectional view of the same,

Figures 3, 4, 5, 6 and 7 are horizontal cross-sectional views taken on respective lines of Figure 1.

Figure 4:
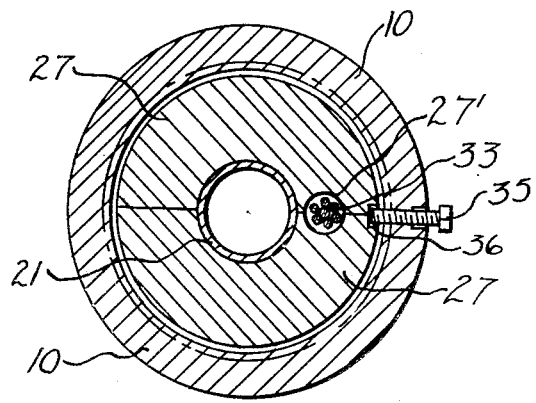
Figure 7:
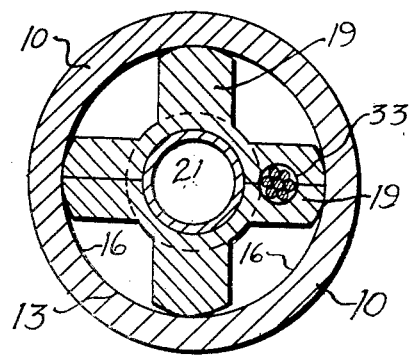

In the drawings the numeral 10 designates an elongated cylindrical body or housing having a counterbored annular collar 11 depending from its end. This collar is internally screw-threaded so as to be screwed onto the upper end of a pipe or tubular connection 12. The body is preferably formed with a bowl 13 intermediate its ends, and with a reduced axial bore 14 extending downwardly from the lower end of the bowl to an annular shoulder 15 at the upper end of the collar, said shoulder overhanging the pipe 12.

The bowl has a downwardly inclined bore 16 terminating at the bore 14. Above the inclined bore the housing has a cylindrical packing chamber 17 provided at its lower end with an annular shoulder 18 extending inwardly to the top of said bore. Slips 19 are constructed to fit in the bore 16 of the bowl. The slips are provided with the usual teeth 20 for engaging a pipe or tubing 21, whereby the latter is suspended or hung in the head. The slips have a snug fit in the bore 16 of the bowl and their lower ends may extend into the axial bore 14 so as to amplify the toothed portions. Pipe connections 22 and 23 may extend from the bore 14.

Figure 6:
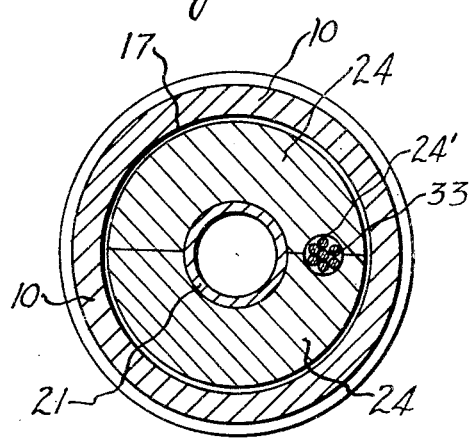

A metallic bottom ring or washer 24 is inserted in the chamber 17 so as to rest upon the tops of the slips, but is of sufficient diameter as to be supported on the shoulder 18, where the slips wear or otherwise move down into the bowl. As is shown in Figure 6, this ring is made in two sections so as to be easily placed in the chamber around the tubing. A plurality of elastic or flexible packing rings 25 are introduced into the chamber 17. These rings, of which three are shown, preferably fit snugly in the chamber, as well as around the tubing, so as to require less distortion to form a seal, but the number and fit are subject to variation.

Figure 5:
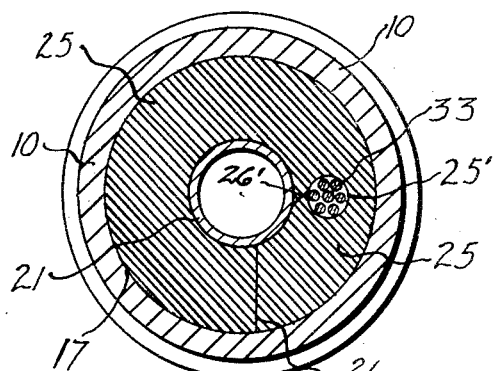
Figure 8:
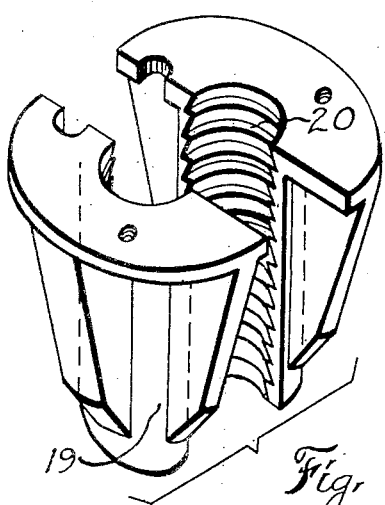
Figure 8 is an isometrical view of the slips.
Figure 9:
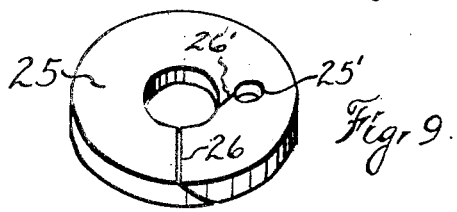
Figure 9 is an isometrical view of the packing rings.

As is shown in Figures 5 and 9, each ring is split to form a scarf joint 26. This is done in order to facilitate placing the ring about the tubing in the chamber 17, and also to assure adequate sealing of the joint when the ring is distorted. A metallic follower ring 27 is made in two sections, as is shown in Figure 4, and is placed in the chamber 17 upon the uppermost packing ring 25.

The upper end of the packing chamber 17 is internally screw-threaded at 28 to receive a cylindrical nut or pressure member 29, which is made in two sections connected by dowel pins 30. The pins are mounted in bosses 31 on the nut, which affords wrench holds. The upper end of the housing 10 is formed with the usual seat 32 for an oil saver or other appliance. By screwing the nut 29 down onto the follower ring, the packing rings 25 are put under pressure and caused to distort or cold-flow radially or horizontally into intimate contact with the inner wall of the chamber 17 and the outer surface of the tubing, thus adequately sealing-off the head above the slips 19. By this arrangement the packing may be replaced without removing the slips or disturbing the tubing, cable, or other well connections.

The essential feature of the invention is the provision whereby an electric cable, small pipe, or other extraneous element may extend through the head and be effectually packed-off. Where an electrically driven pump is located in the casing 12 below the head, this arrangement is very useful. While I have shown a particular structure of head, the invention is not to be limited thereto, except in such respects as may be necessary to practice the invention.

The slips 19, the ring 24, the packing rings 25 and the follower ring 27 are provided with small cylindrical openings or apertures 19', 24', 25' and 27', respectively, of such diameter as to snugly receive a cable 33, which is extended through the elements. When the nut 29 is screwed down, the openings 25' will be contracted to such an extent as to adequately seal-off the cable. To simplify construction the openings in the rings 24 and 27 and the slips 19 may be formed in the meeting edges of the sections, the slips being built so as to permit such a location.

To maintain alinement and to prevent rotation of the follower ring 27 when the nut 29 is screwed up or down, a set screw 35 mounted in the wall of the chamber 17 engages in a notch 36 in the edge of said ring. This notch is of such height as to permit vertical movement of said ring, but to prevent circumferential movement thereof. Retaining the ring also prevents distortion of the cable when the nut is rotated. By holding the ring 27 against rotation and thus holding the cable against circumferential movement in the head, the packing rings 25, the ring 24 and the slips 19 are in turn held against such movement by the cable.

The openings 25' of the elastic packing rings are made in the rings at any point and it is desirable to vary this location in each ring so that when the cable is passed through the rings the joints 26 will be mismatched or broken, thus obviating leaks. Each rubber ring 25 is split at 26' between the opening 25' and the inner periphery of said ring. This split permits the ring 25 to be inserted in the head around the cable without threading the cable through the opening 25'. This is an important feature, because the cable is usually wound on a large spool and after the electrically driven pump or other device has been inserted in the well, there are still several feet of cable wound around the spool and if the split 26' were not provided, it would be necessary to unwind the cable from said spool and thread the packing rings 25 thereon, which would not only be impractical, but expensive. Thus it is obvious that with the above arrangement, the rings 25 may be inserted or removed from the cable at any time. Since the slips 19 and rings 24 and 27 are constructed in halves, and the rings 25 are split, all parts may be placed or removed when the cable is extending through the housing. It is obvious that the nut 29 rotating around the tubing 21 and the cable 33, may be screwed down to pack-off the head in the usual manner, and at the same time to grip the cable in the packing rings 25, whereby it is sealed-off against leaks under high pressures. The term "tubing" as used herein is intended to cover tubing, casing or pipe.

What I claim and desire to secure by Letters Patent is:

1. A well tubing head comprising, a housing, means for hanging a tubing in said housing, packing in said housing for sealing off the housing and the tubing, the hanging means and packing having provision for the extension of a cable or the like therethrough, and means to seal off the housing and the tubing as well as to seal around the cable.

2. A well tubing head comprising, a housing, means for hanging a tubing in said housing, packing in said housing for sealing off the housing and the tubing, the hanging means and packing having provision for the extension of a cable or the like therethrough, means to seal off the housing and the tubing as well as to seal around the cable, and means for holding the packing against rotation while it is being distorted.

3. A well tubing head comprising, a housing, means for hanging a tubing in said housing, packing in said housing, a cable extending through the packing and the housing, rotatable means for exerting pressure on said packing and distorting the same to pack and seal off the housing and the tubing and the cable.

4. A well tubing head comprising, a housing, means for hanging a tubing in said housing, packing in said housing, a cable extending through the packing and the housing, means for exerting pressure on said packing and distorting the same to packing and seal off the housing and the tubing and the cable, and means for holding the cable against circumferential movement in the head.

5. A well tubing head comprising, a housing, means for hanging a tubing in said housing, packing in said housing for sealing off the housing and the tubing, the hanging means and packing having provision for the extension of a cable or the like therethrough, means to seal off the housing and the tubing as well as to seal around the cable, the hanging means and the distorting means being made in sections so that they may be inserted in the head while the tubing and the cable are extending therethrough.

6. A well tubing head comprising, a housing, slips engaged in the housing for supporting a tubing, packing rings mounted in the housing, the packing rings and the slips having registering openings for receiving a cable, and means engaging in the housing for distorting the packing rings into sealing relation to the housing and the tubing as well as the cable.

7. A well tubing head comprising, a housing, slips engaged in the housing for supporting a tubing, packing rings mounted in the housing, the packing rings and the slips having registering openings for receiving a cable, rotatable means engaging in the housing for distorting the packing rings into sealing contact with the housing and the tubing as well as the cable, and means for holding the cable and the packing rings against circumferential movement in the housing.

8. A well tubing head comprising, a housing, slips engaged in the housing for supporting a tubing therein, elastic packing rings mounted in the housing, a follower ring disposed in the housing and engaging the rings, means for holding the follower ring against rotation, the slips and packing rings and follower ring having registering openings for receiving a cable, and means engaging in the housing and contacting the follower ring for applying pressure to the packing rings to distort them into sealing contact with the housing and tubing as well as the cable.

9. A well tubing head comprising, a vertical housing having a packing chamber therein and a bowl below said chamber provided with an inclined wall, slips engaging in said bowl for supporting a tubing, packing rings engaging in the packing chamber, a follower ring mounted on the packing rings, the rings and slips having registering openings for receiving a cable, and a cylindrical nut screwed into the top of the housing and bearing upon the follower ring for distorting the packing rings to seal off the head and the tube and the cable.

10. A well tubing head comprising, a vertical housing having a packing chamber therein and a bowl below said chamber provided with an inclined wall, slips engaging in said bowl for supporting a tubing, split elastic packing rings engaging in said packing chamber, a follower ring resting upon the packing rings, the rings and slips having registering openings for receiving a cable, the openings in the packing rings being so located as to cause the said rings to break joints at their splits, and means at the upper end of the housing for exerting pressure on the follower ring to distort the packing rings to pack off the housing, the tubing and the cable.

11. A well tubing head comprising, a vertical housing having a packing chamber therein and a bowl below said chamber provided with an inclined wall, slips engaging in said bowl for supporting a tubing, split packing rings engaging in said packing chamber around the tubing and having split openings for engaging around an upright extraneous element passing through said housing, whereby said rings may be placed and removed without removing said element, and means engaging in the upper end of the housing for distorting said packing rings into packing contact with the tubing and said housing.

SHERIDAN P. TSCHAPPAT.